O. KIRSCH.
VEHICLE WHEEL RIM.
APPLICATION FILED APR. 5, 1909.

940,602.

Patented Nov. 16, 1909.

Witnesses:
A. B. Hauscom,
Glenara Py.

INVENTOR-
Oswald Kirsch
BY C. E. Humphrey
ATTORNEY

UNITED STATES PATENT OFFICE.

OSWALD KIRSCH, OF AKRON, OHIO.

VEHICLE-WHEEL RIM.

940,602.

Specification of Letters Patent.  Patented Nov. 16, 1909.

Application filed April 5, 1909.  Serial No. 487,932.

*To all whom it may concern:*

Be it known that I, OSWALD KIRSCH, a subject of William II, Emperor of Germany, residing at Akron, in the county of Summit and State of Ohio, have invented new and useful Improvements in Vehicle-Wheel Rims, of which the following is a specification.

This invention relates to vehicle wheels and the object thereof, broadly, is to provide a suitable wheel for a vehicle, the periphery of which is adapted to receive a detachable rim, the latter preferably provided with an elastic tire, said tire rim arranged to be slipped laterally onto said wheel and be there locked detachably in position, whereby the user of a vehicle by carrying an extra supply of tire rims each provided with an elastic tire previously inflated, can, when an injury occurs to the tire in use, remove the latter, together with its rim and substitute another.

A further and more specific object of the invention consists in so constructing a vehicle wheel that a detachable rim may be slipped laterally thereon, said detachable rim provided with an elastic tire of any desired type and when mounted on the wheel may be locked there securely against lateral displacement or circumferential movement.

A still further object of this invention is to provide new and efficient means for locking the detachable rim in position on a vehicle wheel.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 1:
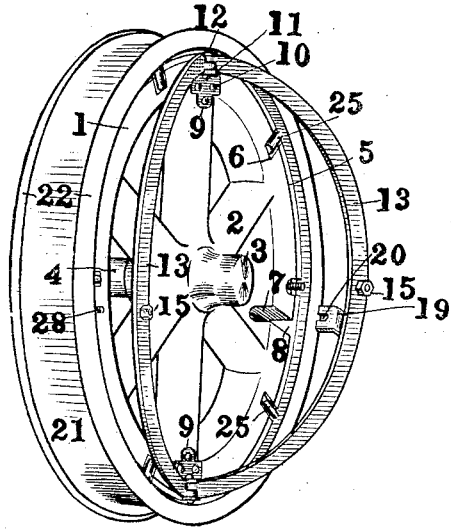
Figure 2:
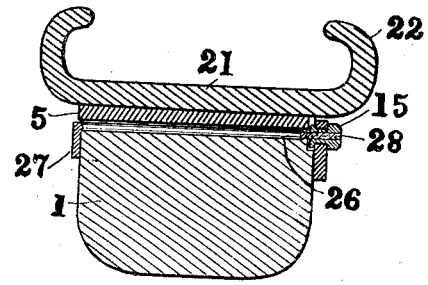
Figure 3:
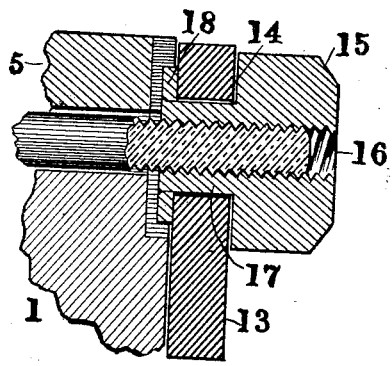
Figure 4:
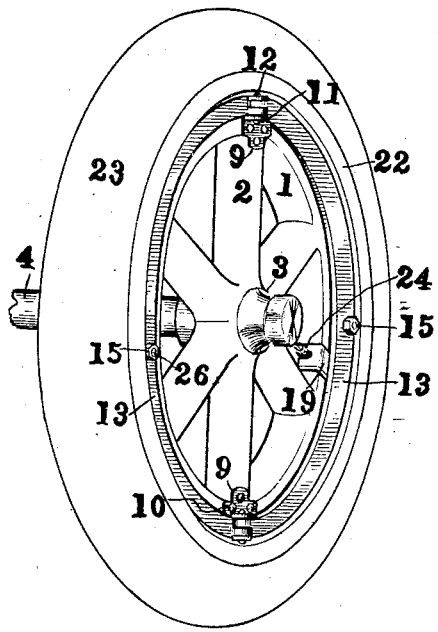

In the drawings, in which similar reference numerals indicate like parts in the different figures: Figure 1 is a perspective view of a vehicle wheel with a rim positioned thereon, said vehicle wheel provided with a locking means arranged in its inoperative position. Fig. 2 is a transverse sectional view of the rim portion of a vehicle wheel embodying this invention with a tire rim mounted thereon. Fig. 3 is a sectional view showing a portion of a preferred form of locking device for retaining a tire rim on a vehicle wheel; and, Fig. 4 is a perspective view of a vehicle wheel with a tire rim mounted thereon, said tire rim provided with a pneumatic tire with the locking means therefor in operative position for locking the tire rim securely in position on the wheel.

Referring to the drawings in detail, the reference numeral 1 denotes the felly of a vehicle wheel used to illustrate this invention, provided with spokes 2 and a hub 3 mounted on an axle 4 in the ordinary manner.

The construction of the wheel and its felly are immaterial as far as this invention is concerned, but the latter is preferably provided with a rim 5 the outer face of which is inclined, as shown in Fig. 2 and is preferably held in position by frictional engagement with the outer face of the felly. The felly 1 and rim 5 are provided with a plurality of registering recesses 6 usually semi-circular in cross section and preferably stopping short of the inner face of the felly 1. The felly 1 is also further provided with a large recess 7 adapted to register with a similar recess 8 in the rim 5 adapted to receive the inflating tube and valve of a pneumatic tire. On the outer face of the felly and preferably positioned opposite the termini of two of the spokes of the wheel are a pair of brackets 9 secured to the wheel by holdfast devices 10, each of said brackets provided with a projecting flange 11 from which projects a pin 12. Pivotally-mounted on the pins 12 are a pair of curvilinearly-formed members 13 the inner and outer edges of which are approximately concentric with the axle 4 of the wheel. The ends of the members 13 which receive the pins 12 as pivots are preferably outwardly-turned so that when the members 13 are moved to their operative position one of the faces thereof will, under normal conditions, bear against the side face of the felly 1. Each of the members 13 is provided with a medially-placed opening 14 in which is rotatably-mounted a nut 15 having a threaded opening 16 and provided with a cylindrical shank 17 arranged to be mounted in said opening 14. The inner end of the shank 17 is provided with a collar 18 for preventing the unintentional removal of the nut so that the latter is carried at all times by the member 13. The nuts 15 are preferably positioned diametrically opposite each other and half way between the ends of each of the members 13. Mounted on one of the members 13 opposite the large recess 7 which receives the inflating tube of the tire is a guard for the same which consists of an angle plate 19 held in place by any appropriate means, the end of which is inwardly bent, so that when the member 13 is swung against the side of the felly, the end of the angle plate 19 will extend across the inner face of the felly. This angle plate 19 is provided with a recess 20 to receive the inflating tube, so that when the member 13 is against the face of the felly, the end of the plate 19 will close the inner portion of the opening 7 and the recess 20 receive the inflating tube.

Arranged to be mounted on the rim 5 is a tire holding rim comprising a base portion 21 the inner surface of which is preferably inclined in order to seat perfectly on the wheel rim 5, and the outer face constitutes a seat for a tire provided with tire-retaining means such as clencher flanges 22, although other types of retaining means for an elastic tire may be employed if desired. Mounted on the seat 21 and held by the retaining means 22 is a pneumatic tire 23 which may be of any type desired, provided with the customary inflating tube or valve stem 24 passed through a suitable opening in the base of the rim 21 in the usual manner. Projecting inwardly from the inner face of the rim 21 are a plurality of pins 25 spaced apart from each other and so disposed that when the rim 21 is mounted on the rim 5 the pins 25 may be seated in the registering recesses 6 in the felly and rim 5. The pins 25 are preferably made larger than the recesses 6 so that when seated therein a minor portion of the pins will project beyond the plane of the lateral face of the felly 1.

In order to hold the members 13 in operative position, a pair of bolts 26 are employed which are passed through suitable openings in the outer face of the felly immediately within the rim 5 and extend across the felly. These bolts 26 are provided with flanged heads 27 and their opposite ends 28 project from the face of the felly and are provided with threads to engage the nuts 15.

In assembling a wheel for use in connection with this invention, the wheel is first lifted from the ground, usually by applying a suitable jack to the axle 4. The members 13 are then swung outwardly away from the felly. A rim 21, preferably equipped with an inflated tire with the inflating tube projecting through an appropriate opening therein is then moved laterally onto the outer face of the rim 5, in doing which it will be so disposed that the pins 25 are in alinement with the recesses 6 and the inflating tube in alinement with the openings 7 and 8. The rim 21 will then be pushed snugly onto the rim 5 by hand, after which the members 13 are swung away from each other until the threaded ends 28 of the bolts 26 engage the threaded openings 16 of the nuts 15, and the nuts 15 are manipulated to draw the members 13 snugly against the pins 25 thus clamping them firmly in the recesses 6 and forcing the inflating tube into the openings 7 and 8. When the member 13 which bears the angle plate 19 is swung to place the extended end thereof will be disposed across the inner end of the opening 7, thereby effectively closing the same and at the same time the recess 20 receives the inflating tube 24 allowing the latter to project outwardly so as to be accessible to reinflate the tire as desired. The balance of the plate 19 effectually closes the outer exposed portion of the openings 7 and 8, thereby preventing the entrance therein of dirt and other foreign substances. If desired, the outer face of the felly surrounding the openings occupied by the bolts 26 may be recessed sufficiently to receive the collars 18 of the nuts 15 in order to permit the members 13 to be brought into snug engagement with the pins 25.

What I claim and desire to secure by Letters Patent, is:—

1. A vehicle wheel having a rim with an inclined outer face provided with a plurality of spaced recesses, a detachable rim provided with a plurality of spaced inwardly-projecting pins, arranged when said detachable rim is positioned, to be received in said recesses, said detachable rim arranged to carry an elastic tire, a pair of oppositely-disposed brackets mounted on the side of said wheel, each of said brackets provided with a radially-projecting pin, a pair of semi-circular members conforming in contour to said detachable rim the ends of which are mounted on said radially-projecting pins, each of said semi-circular members provided with a rotatable nut having a threaded aperture and a plurality of studs having threaded projecting ends carried by said wheel arranged to engage in the threaded openings in said nuts for clamping said semi-circular members against the inwardly-projecting pins of said detachable rim for removably locking them in said recesses whereby said detachable rim is temporarily secured in position.

2. A vehicle wheel having a rim with an inclined outer face provided with a plurality of spaced recesses, a tire rim adapted to be mounted on said wheel rim provided with a plurality of spaced inwardly-projecting pins, arranged when said tire rim is positioned, to be received in said recesses, a pair of oppositely-disposed brackets mounted on the side of said wheel, a pair of semi-circular members conforming in contour to said tire rim the ends of which are pivotally-mounted on said brackets, each of said semi-circular members provided with means co-operating with an element carried by said wheel operating when said means and element are in engaging relation to draw said semi-circular members against the inwardly-projecting pins on said tire rim for removably locking them in said recesses, whereby said latter rim is temporarily secured in position on said wheel rim.

In testimony whereof I have hereunto set my hand in presence of two subscribing witnesses.

OSWALD KIRSCH.

Witnesses:
C. E. HUMPHREY,
GLENARA FOX.